No. 860,793. PATENTED JULY 23, 1907.
C. D. EYMANN.
MEANS FOR PROTECTING CORN POPPER HANDLES.
APPLICATION FILED MAR. 7, 1907.
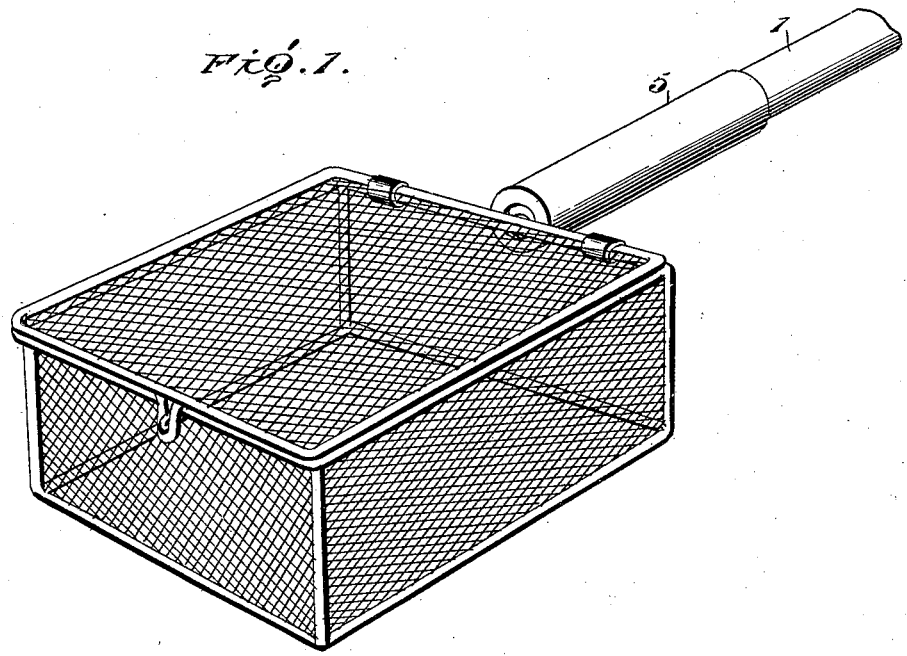
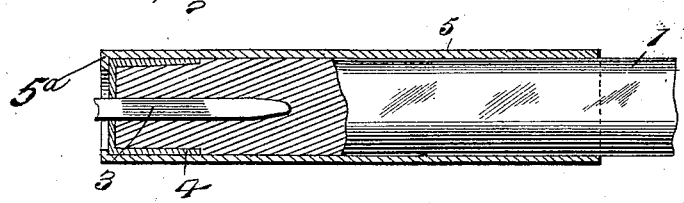
Inventor
C. D. Eymann

UNITED STATES PATENT OFFICE.

CORNELIUS D. EYMANN, OF GREENFIELD, IOWA.

MEANS FOR PROTECTING CORN-POPPER HANDLES.

No. 860,793.  Specification of Letters Patent.  Patented July 23, 1907.

Application filed March 7, 1907. Serial No. 361,079.

*To all whom it may concern:*

Be it known that I, CORNELIUS D. EYMANN, a citizen of the United States, residing at Greenfield, in the county of Adair and State of Iowa, have invented certain new and useful Improvements in Means for Protecting Corn-Popper Handles, of which the following is a specification.

This invention contemplates certain new and useful improvements in corn poppers.

It is well known that in the use of corn poppers, the wooden handles are exposed to the flames and heat, and not only quickly dry out and crack or split, but are burned or charred and soon become unfit for use, necessitating the throwing away of the entire popper or at least the substitution of a new handle.

My invention has for its object an improved construction of corn popper provided with a protective sleeve for the tray end of the handle, insuring that the handle may be used repeatedly without becoming burned and thus rendered unfit for use.

With this and other objects in view as will more fully appear as the description proceeds, the invention consists in the details of construction, which I shall hereinafter describe and claim.

For a full understanding of the invention and the merits thereof and also to acquire a knowledge of the details of construction of the means for effecting the result, reference is to be had to the following description and accompanying drawings, in which:

Figure 1 is a perspective view of a corn popper embodying the protective sleeve of my invention; and, Fig. 2 is a sectional view of the handle portion of the device.

Corresponding and like parts are referred to in the following description and indicated in all the views of the drawings by the same reference characters.

Referring to the drawing, the numeral 1 designates the handle of the popper, and 2 the tray of wire mesh or similar material. The handle may be of any desired shape, either straight or curved and of any desired size, and the trays may manifestly also be of any size or construction.

3 designates the socket in which the end of the tray is inserted so as to secure the tray to the handle, and 4 designates a thimble, preferably of metal, which is inserted over the end of the handle to prevent the same from splitting.

My invention resides essentially in the provision of a metallic sleeve 5 which encircles the end of the handle as shown and extends some distance beyond the margin of the thimble 4, so that the handle, in the use of the device will be insured against becoming burned or charred by the action of the flames.

As clearly illustrated in Fig. 2, it will be seen that the sleeve 5 is provided at one end with an inturned annular flange 5ª adapted to abut against the outer side of the thimble 4 so as to limit the movement of the sleeve 5 when the latter is slipped over the handle 1.

Having thus described the invention, what is claimed as new is:

1. A corn popper consisting of a tray and a handle to which said tray is secured, a thimble secured to the end of the handle and extending around the sides and extremity of said handle, and a metallic protective sleeve incasing the handle and thimble and extending beyond the margin of the latter.

2. A corn popper consisting of a tray and a handle to which said tray is secured, a thimble extending around the end of the handle, and a metallic protective sleeve adapted to be slipped on the handle over the thimble and extending beyond the margin of said thimble, said sleeve being provided at one end with an inturned flange 5ª adapted to abut against the thimble to limit the movement of the sleeve on the handle.

In testimony whereof I affix my signature in presence of two witnesses.

CORNELIUS D. EYMANN. [L. S.]

Witnesses:
H. G. SPOONER,
FRANK B. WILSON.